United States Patent [19]

Haarhoff et al.

[11] 4,113,448

[45] Sep. 12, 1978

[54] GAS SEPARATION PROCESS AND TREATMENT OF A GAS IN A GAS SEPARATION PROCESS

[75] Inventors: Pierre Cloete Haarhoff, Schoemansville; Werner Adolf Schumann, Pretoria, both of South Africa

[73] Assignee: Atomic Energy Board, Pelindaba, South Africa

[21] Appl. No.: 819,016

[22] Filed: Jul. 25, 1977

Related U.S. Application Data

[63] Continuation of Ser. No. 673,572, Apr. 5, 1976, abandoned.

[30] Foreign Application Priority Data

Apr. 17, 1975 [ZA] South Africa .................. 75/2442

[51] Int. Cl.$^2$ ............................................ B01D 57/00
[52] U.S. Cl. ................................. 55/17; 55/69; 55/277
[58] Field of Search .................. 55/17, 69, 277, 434

[56] References Cited

U.S. PATENT DOCUMENTS

| | | | |
|---|---|---|---|
| 2,536,423 | 1/1951 | Cohen et al. | 55/17 X |
| 2,951,554 | 9/1960 | Becker | 55/17 |
| 3,320,722 | 5/1967 | Lucas | 55/17 |
| 3,509,932 | 5/1970 | Chambers | 55/17 X |
| 3,541,801 | 11/1970 | Marchal et al. | 55/17 |
| 3,616,596 | 11/1971 | Campargue | 55/277 X |
| 3,626,665 | 12/1971 | Fenn et al. | 55/17 |
| 3,922,871 | 12/1975 | Bolesta | 55/17 |

Primary Examiner—Thomas G. Wyse
Assistant Examiner—Robert H. Spitzer
Attorney, Agent, or Firm—Ladas, Parry, Von Gehr, Goldsmith & Deschamps

[57] ABSTRACT

Treating fluid of a single phase by feeding a stream of it into a passage so that its composition varies in a known fashion regarding a specific property over a cross-section of the stream transverse to its direction of flow. The stream is moved along the passage and parts of the stream having different compositions are separated before the variation disappears.

Fluid treatment apparatus defines a passage forming at least part of a circuit. The circuit has an inlet and an outlet and means for causing flow of a single phase fluid around the circuit, and for circulating at least part of the fluid more than once around the circuit, along a helix-like path.

24 Claims, 36 Drawing Figures

GAS SEPARATION PROCESS AND APPARATUS FOR THE TREATMENT OF A GAS IN A GAS SEPARATION PROCESS

This is a continuation of copending application Ser. No. 673,572 filed Apr. 5, 1976 and now abandoned.

This invention relates to the treatment of fluid. In particular it relates to a method of treating a fluid, and to apparatus for the treatment of a fluid.

According to the invention a method of treating a fluid comprises:

feeding into a length of passage a stream of fluid of a single phase and having a composition which varies in a known fashion with respect to a specified property thereof over a cross-section of the stream transverse to the direction of movement of the stream;

moving the stream along the length of passage; and before the variation in composition of the stream has disappeared, separating at least some parts of the stream having different compositions from one another while withdrawing them from the passage.

The specified property may be physical or chemical. Thus parts of the stream of different composition will be different from one another with respect to that property. By "single phase" is meant that the fluid is a gas, or it is a liquid comprising fully miscible components having no interfaces.

The stream when fed into the passage may have a composition which varies from a minimum with respect to the specified property, to a maximum with respect to the specified property. The variation in composition may be substantially continuous, or it may be substantially stepwise.

The length of passage may be circular or preferably annular in cross-section, the composition of the stream varying in a circumferential direction from said minimum to said maximum, the minimum and maximum being located at diametrically opposed positions.

The method may include, prior to separating said parts of the stream from one another, carrying out one or more process steps on the stream. The method may thus include, as a process step, changing the pressure of the fluid in the stream. Moving the fluid along the passage may thus be by means of an axial flow impeller or propeller, the impeller increasing the pressure of the fluid in the stream. The method may also include, as a process step, changing the temperature of the fluid in the stream. Changing the temperature of the fluid in the stream may be by means of a foraminous heat exchange element extending across the passage. The method may also include, as a process step, removing and adding fluid to the stream. Fluid may be removed from the stream by means of an isotope separator which alters the isotopic composition of the stream; and fluid may also be removed from or added to the stream by ducts opening out of and into the passage respectively.

The method may include using partitions extending in the direction of flow along part of the passage, to separate parts of the stream from one another, thereby to combat disappearance of the variation in composition of the stream.

The passage may form or form part of an endless circuit along which the stream moves, at least part of the stream circulating around the circuit more than once. The fluid of the stream may thus follow a plurality of different helix-like paths as it flows around the circuit. Where the passage is annular in cross-section, the composition varying circumferentially from a minimum to a maximum, as described above, there may be two helix-like paths, each extending circumferentially from the minimum to the maximum and each passing more than once around the circuit. The method may include diverting the flow of at least part of the stream, upstream and adjacent the position where the fluid is fed into the length of passage, to encourage flow of the fluid along said plurality of helix-like paths.

The circuit may be defined by an inner cylindrical housing located within and extending along the interior of an outer cylindrical housing, opposite ends of the inner housing opening into opposite ends of the outer housing, the helix-like paths having axes which extend in opposite circumferential directions relative to the housing from the minimum to the maximum.

When the method is applied to isotope separation and the passage forms or forms part of an endless circuit along which the stream moves, the fluid fed into or added to the stream is preferably added to that part of the stream having the closest isotopic composition to that of the fluid which is added.

When the stream is moved along the passage by means of an axial flow impeller or propeller, the stream of fluid will be rotated bodily by a certain angle as it passes through the impeller or propeller. The method may thus include deflecting the stream in a circumferential direction to compensate for the rotation of the stream relative to the passage which has been caused by means of the compressor.

Further according to the invention apparatus for the treatment of a fluid comprises:

means defining a passage which forms or forms part of a circuit;

at least one inlet into the circuit and at least one outlet from the circuit;

means for causing flow of a fluid stream of a single phase along the circuit and for circulating at least one part of the stream more than once around the circuit, said part following a helix-like path around the circuit and through the passage.

The apparatus may include deflecting means for diverting fluid flowing along the circuit, to cause said part or parts to follow said path or paths.

The apparatus may include one or more partitions extending along part of the passage in the direction of flow, and the means for causing the flow may be an axial flow impeller or propeller.

The apparatus may include a foraminous heat exchange element in and extending across the passage for changing the temperature of the fluid stream as it flows along the circuit.

The passage may be annular, there being a main inlet into one sector of the passage and a main inlet from a diametrically opposed sector of the passage, to cause fluid entering the main inlet to divide into two parts which follow different helix-like paths around the circuit to the main outlet. The circuit may be defined by an inner cylindrical housing extending along the interior of an outer cylindrical housing, opposite ends of the inner housing opening into opposite ends of the outer housing.

The apparatus may include an isotope separator in the circuit for performing an isotope separation on the fluid stream as it flows along the circuit.

The apparatus may have a plurality of subsidiary inlets into the circuit which are spaced relative to one another and a plurality of subsidiary outlets from the circuit which are spaced relative to one another.

In the detailed description of the invention which follows hereunder, the invention is described and illustrated for convenience mainly with reference to a process of isotopic separation with a cut of 1/5, i.e. the fraction of the feedstream which leaves the separating elements as an enriched stream is 1/5 on a mass flow basis, and the enriched stream is ¼ of the depleted stream leaving the element on a mass flow basis. The example is for a case where the enriched and depleted streams leaving such element are at the same pressure. The example may apply either to a process in which a stream of fluid consisting only of a process gas (such as $UF_6$ to be enriched with respect to $U^{235}$) is treated, or to a process in which a stream of fluid comprising a mixture of a process gas and a carrier gas such as $H_2$ or helium is treated. However, all references hereafter to the isotopic composition and mass flow of a stream of gas are to the isotopic composition and mass flow of the process gas in the stream.

The invention will now be described, by way of example, with reference to the accompanying drawings.

Figure 1:
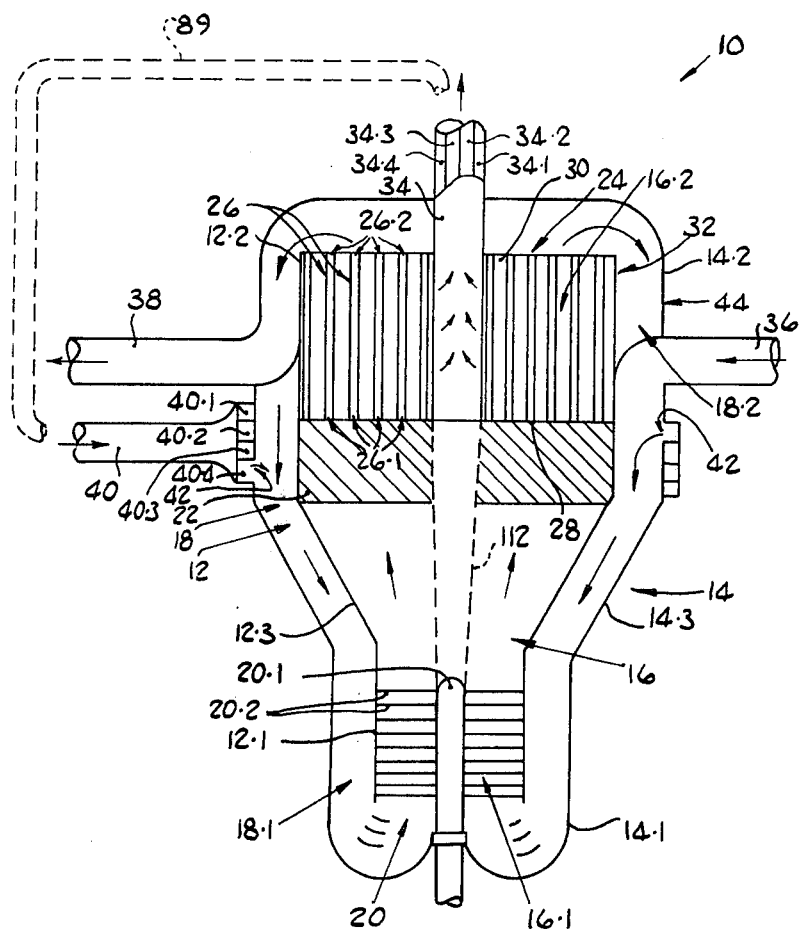
FIG. 1 shows an axial sectional side elevation of apparatus for the treatment of fluid in accordance with the invention.
Figure 1A:
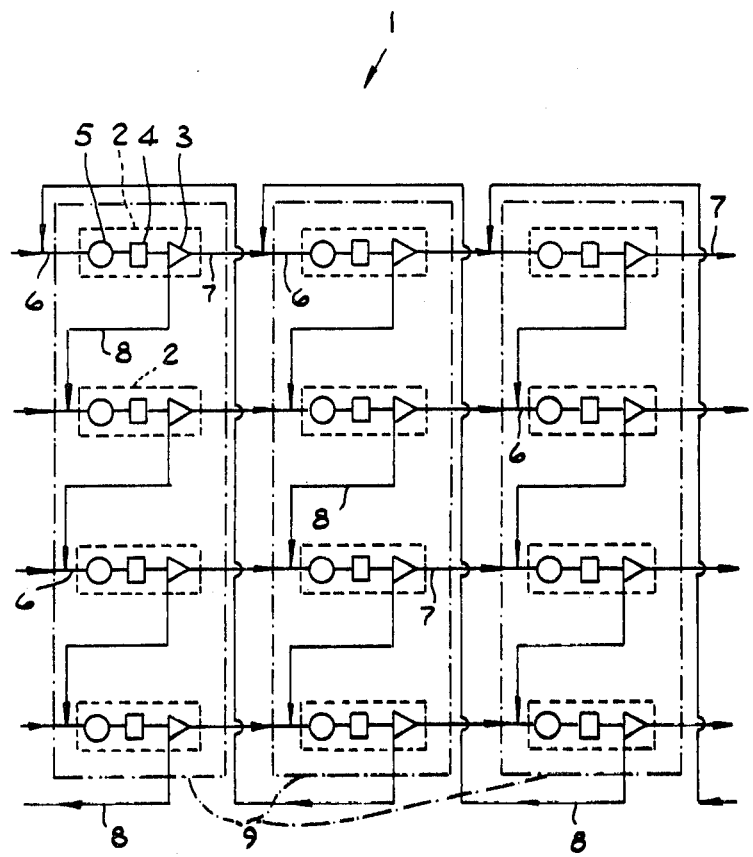
FIG. 1A shows a schematic flow diagram of part of a cascade arrangement suitable for a cut of 1/5.

In FIG. 1A reference numeral 1 generally designates part of a block forming part of a cascade arrangement, the cascade arrangement being made up of a plurality of blocks interconnected in series. Each block comprises a plurality of substantially indentical stages 2, each stage 2 in turn comprising an isotope separator 3, a heat exchanger 4 and a compressor 5 adapted to circulate a stream of gas in series through the heat exchanger 4 and separator 3. The stages 2 are interconnected by means defining feed streams 6, enriched streams 7, and depleted streams 8. Each feed stream 6 entering a stage 2 is made up of streams 7 and 8 from two further different stages 2, and passes via the associated compressor 5 and heat exchanger 4 into the associated separator 3 where it is divided into further streams 7 and 8. The further streams in turn lead to two further stages 2. In FIG. 1A, the part of the block is shown comprising three groups 9 of four stages 2 each. Each group receives as a feed four enriched streams 7 from the preceding group and a depleted stream 8 from the succeeding group 9. The stages can be regarded as being connected in series with the enriched streams 7 flowing counter current to the depleted streams 8 along the cascade. Thus each stage is shown receiving as part of its feed the depleted stream 8 from the succeeding stage, and as part of its feed the enriched stream from the stage which is four behind it in the series, the series being regarded as progressing forwardly, together with the degree of enrichment of the streams, along the cascade. Each stream 7 is ¼ of the stream 8 leaving the same stage on a mass flow basis; and the streams 7 and 8 combining to form each stream 6 have about the same isotopic composition. The cascade arrangement has an inlet feed stream, a final outlet enriched stream and a final outlet depleted stream (not shown), and the rate at which fluids are fed into and withdrawn from the cascade via these streams is controlled to obtain desired mass flow rates and isotopic compositions throughout the cascade arrangement. The interconnection of the stages 2 described above is for internal stages which are in the interior of the block, remote from its boundaries. At the boundaries of the block, i.e. the interfaces between the block and adjacent blocks, the block will have terminal stages whose interconnections to other stages may be different, as dictated by the construction of the cascade, from the interconnections of the stages 2 described.

In FIG. 1 of the drawings, reference numeral 10 generally designates apparatus in accordance with the invention and suitable for the isotopic separation of gases. The apparatus 10 comprises an inner housing 12 and an outer housing 14 around the inner housing 12. The housing 12 is hollow-cylindrical and open-ended, having a narrow portion 12.1 and a broad portion 12.2 interconnected by a tapering portion 12.3. Likewise, the outer housing 14 is hollow-cylindrical having a narrow portion 14.1 and a broad portion 14.2 interconnected by a tapering portion 14.3. The ends of the outer housing are closed. The narrow portion 12.1 is located in the narrow portion 14.1; the broad portion 12.2 in the broad portion 14.2; and the tapering portion 12.3 in the tapering portion 14.3.

The housing 12 defines a passage 16 having a narrow portion 16.1 opening into the narrow portion 14.1 of the housing 14; and a broad portion 16.2 opening into the broad portion 14.2 of the housing 14. The housings 12, 14 are coaxial and the open ends of the housing 12 are spaced axially inwardly from the closed ends of the housing 14. The housings 12, 14 define an annular passage 18 therebetween, having a narrow portion 18.1 in communication with the narrow portion 16.1 of the passage 16; and a broad portion 18.2 in communication with the broad portion 16.2 of the passage 16. The passages 16, 18 together thus define an endless passage or circuit, having an inner tubular part formed by the passage 16, and an outer annular part, within which the inner part is located, defined by the passage 18.

An axial flow impeller in the form of an axial flow compressor 20, having a shaft 20.1 and a plurality of blades 20.2, is provided in the passage 16. The shaft 20.1 is coaxial with the passages 16, 18 and projects inwardly, from the exterior of the housing 14, into the narrow portion 16.1 of the passage 16. The blades 20.2 are located in the narrow portion 16.1 of the passage 16.

A heat exchanger comprising a foraminous heat exchange element 22 is located in the passage 16. The heat exchanger 22 extends across the broad portion 16.2 of the passage 16, adjacent the tapering portion 12.3 of the housing 12.

A separator 24 including a plurality of isotopic gas separation elements 26 is located in the broad portion 16.2 of the passage 16, the heat exchanger 22 being between the separator 24 and the impeller 20. The elements 26 each have an inlet 26.1 in communication with the passage 16 and directed towards the narrow portion 16.1 of the passage 16; a main outlet 26.2 in communication with the circuit and directed towards the closed end of the broad portion 14.2 of the housing 14; and at least one subsidiary outlet between the main outlet and the inlet. The elements are, for the purpose of FIGS. 1 to 7, of a type which has a cut of 1/5 i.e. they separate a feed stream into an enriched stream and a depleted stream, the enriched stream being $\frac{1}{4}$ of the depleted stream on a mass flow basis. Two partitions 28, 30, located respectively between the heat exchanger 22 and separator 24, and at the free end of the broad portion 16.2 of the passage 16, isolate a compartment 32 in the passage 16 from the rest of the circuit. The inlets 26.1 and main outlets 26.2 of the elements 26 are respectively from and into the circuit outside the compartment 32; and the subsidiary outlets are into the compartment 32. The compartment 32 has an axially located outlet duct 34 which extends axially outwardly from the compartment 32 and out through the end of the broad portion 14.2 of the housing 14. It will be appreciated that the subsidiary outlet of each element 26 may instead of being a discrete outlet, comprise a permeable surface on the element, depending on the isotope separation process which is considered.

A main inlet 36 in the form of a pipe enters the broad portion 18.2 of the passage 18 and is directed in the passage 18 in an axial direction towards the narrow portion 18.1 of the passage. A main outlet 38 in the form of a pipe leaves the broad portion 18.2 of the passage and is directed into the passage 18 in the opposite axial direction to the inlet 36. The inlet 36 and outlet 38 are at diametrically opposed positions along the circumference of the passage 18.

A further inlet in the form of a duct 40 having four subsidiary ducts 40.1, 40.2, 40.3, and 40.4 extends circumferentially around the housing 14.

The duct 40 has a plurality of flow connections from its subsidiary ducts 40.1 to 40.4 into the annular passage 18, arranged circumferentially around the annular passage 18. The location of these flow connections, two of which are shown in FIG. 1, indicated by reference numeral 42, will be described in more detail hereunder.

The duct 34 is likewise internally divided by partitions into four subsidiary ducts 34.1, 34.2, 34.3 and 34.4, which open via flow connections into the compartment 32. Here again, the arrangement of the flow connections will be described in more detail hereunder.

Deflecting means is provided in the annular passage 18, adapted to deflect the flow of a fluid along the passage 18. The function of the deflecting means will be described in more detail hereunder. The deflecting means comprises a plurality of the deflecting elements, conveniently in the form of curved deflector plates (not shown) in the passage 18. The plates extend between the housings 14 and 12, and, when viewed edge — on in a radially inward direction, extend at an angle to the longitudinal dimension, i.e. the polar axis, of the apparatus 10. The plates are located in a circumferentially extending ring at 44, immediately upstream of the main inlet 36.

The operation of the apparatus will now be described also with reference to FIG. 2 in which reference numeral 46 generally designates a flow diagram of the apparatus of FIG. 1; and to FIGS. 3A to 3H, in which reference numeral 48 generally designates various cross-sections of the apparatus 10 of FIG. 1. Unless otherwise specified, like reference numerals refer to like parts.

The apparatus 10 forms a module adapted to accommodate a group of stages forming part of a block in a cascade arrangement for an isotopic separation process for gases, there being a number of similar modules, interconnected in series. An isotopic gas mixture comprising a first component, and a second component which is isotopically different from the first component, is moved along the series. In each module an isotopic separation takes place, whereby the gas mixture is separated into two streams, i.e. a stream which is enriched with respect to a desired component, for example the first component; and a stream which is depleted with respect to said desired component. Each module receives as a feed the enriched stream from a previous module of the series, and the depleted stream from a succeeding module in the series. The enriched stream from the previous module is generally designated 50, and passes along the duct 40. The said stream 50 is divided into four substreams 50.1, 50.2, 50.3 and 50.4. These substreams have different isotopic compositions, i.e. their concentration or degree of enrichment with respect to the desired component, defined as the ratio on a mass basis between the desired (first) component and the other (second) component, is different. They pass respectively along the subsidiary ducts 40.1, 40.2, 40.3 and 40.4. The depleted stream from the succeeding module is indicated by reference numeral 52.

The depleted stream 52 enters the passage 18 of the apparatus 10 via main inlet 36. The subsidiary duct 40.1 has a single flow connection 42 into the passage 18, and this flow connection is immediately downstream of and axially aligned with the inlet 36. The substream 50.1 has substantially the same isotopic composition as the stream 52. If desired, mixing means, such as for example a nozzle, baffle or the like, may be provided at the connection 42 to promote mixing between the streams 52 and 50.1. Such mixing means may be provided for each connection 42 described hereunder.

The combined stream formed from the substream 50.1 and the stream 52 flows axially along the passage 18 towards the narrow end 14.1 of the housing 14. This flow takes place substantially along a sector of the passage 18, and the combined stream enters the compressor 20, where it flows along a sector of the compressor 20 in the passage 16, indicated by reference numeral 54 in FIGS. 2 and 3A. The flow of the said stream 50.1, 52 along said sectors of the passage 18 and the passage 16 through the compressor 20, is such that there is little mixing with streams flowing alongside it. Said stream 50.1, 52 thus forms a sector of the annular stream making up the total flow along the passage 18, and a sector of the annular or circular stream making up the total flow along the passage 16. When the combined stream 50.1, 52 passes through the compressor 20 the sector of the total stream passing along the passage 16 occupied by said combined stream will be displaced in a circumferential direction, being the circumferential direction in which the blades 20.2 of the compressor 20 rotate.

The sector 54 of the compressor 20 will thus follow a helical path along the length of the compressor. There will however be no substantial mixing of this stream with streams in adjacent sectors. The stream 50.1, 52 in its sector 54, flows along the passage 16 and enters a sector of the heat exchanger 22. Its temperature is changed by a desired degree as it passes through the heat exchanger 22, and it passes into the elements 26 of a corresponding sector of the compartment 32, via the inlets 26.1 to the separation elements 26. The sectors in the heat exchanger 22 and compartment 32 (i.e. the separator 24) are indicated in FIGS. 2 and 3E by reference numeral 54.1. These sectors 54.1 need not be axially aligned with the sector 54 where it leaves the compressor 20, as the possibility of circular swirl in a circumferential direction of the total stream along the passage 16 between the compressor 20 and heat exchanger 22 is contemplated.

The combined stream 50.1, 52 undergoes an isotopic separation process in the elements 26 making up the sector 54.1 of the separator 24.

In the sector 54.1 of the separator 24 the combined stream 50.1, 52 is separated into an enriched stream 56.1 and a depleted stream 58.1, the elements 26 having a cut of 1/5 with respect to the process gas. The depleted stream 58.1 passes out of the main outlets 26.2 of the elements 26 making up said sector 54.1. The enriched stream passes out of the subsidiary outlets of said elements 26 and into the compartment 32. In the compartment 32 the enriched stream 56.1 passes into the subsidiary duct 34.1 of the duct 34, and thence it passes on to the next module of the series. The depleted stream 58.1 passes into the passage 18 and flows axially along a sector of the passage 18 to the ring of deflector plates at 44. It strikes one or more of said deflector plates and is split into two substreams 58.1 which pass axially along the passage 18 and on opposite sides of the inlet 36. The subsidiary duct 40.2 has a pair of flow connections 42 into the passage 18, located where the substreams 58.1 pass along the passage 18. The substreams 58.1 are joined via these flow connections 42 by the substream 50.2 from the subsidiary duct 40.2. The substreams 50.2, 58.1 have substantially the same isotopic composition. The combined substreams 50.2, 58.1 pass axially along the passage 18 into the narrow portion 14.1 of the housing 14 on opposite sides of the combined stream 50.1, 52. Said combined substreams 50.2, 58.1 enter a pair of sectors 60 in the passage 16 at the compressor 20, on opposite sides of the sector 54. It will be appreciated that, for ease of representation, the sectors 60 are shown as a single sector in FIG. 2.

The combined substreams 50.2, 58.1, as described for the combined stream 50.1, 52, pass along the passage 16 away from its narrow portion 16.1, through the heat exchanger 22 and into the separator 24. The sectors of the heat exchanger 22 and separator 24 through or into which these combined substreams pass are designated 60.1. Once again, in FIG. 2, this pair of sectors is indicated as a single sector for the heat exchanger 22 and separator 24. Each combined substream 50.2, 58.1 enters the elements 26 of one of the sectors 60.1 of the separator 24, via their inlets 26.1.

In said sectors 60.1 of the separator 24 the combined substreams 50.2, 58.1 are each separated into an enriched substream 56.2 and a depleted substream 58.2. The enriched substreams 56.2 pass through the subsidiary outlets of the elements 26 in said sectors 60.1 into the compartment 32, thence via flow connections into the subsidiary duct 34.2 of the outlet duct 34, to form an enriched stream 56.2, and thence on to the succeeding module of the series.

The depleted substreams 58.2 pass through the outlets 26.2 of the elements 26 in said sectors 60.1, and into the passage 18, on opposite sides of the stream 58.1.

The substreams 58.2 pass along the passage 18 on opposite sides of the stream 58.1 and are deflected by the deflector plates at 44 so that they pass further along the passage 18 on the sides of the combined substreams 58.1, 50.2 remote from the combined stream 50.1, 52. Where the substreams 58.2 pass radially inwardly of the duct 40 they receive the enriched stream 50.3 from the subsidiary duct 40.3, via a pair of flow connections 42. The enriched stream 50.3 has substantially the same isotopic composition as the substreams 58.2.

The combined substreams 50.3, 58.2 pass axially along the passage 18 away from the deflector plates at 44 and towards the narrow portion 18.1 of said passage. Said combined substreams 50.3, 58.2 are located respectively on the sides of the combined substreams 50.2, 58.1 remote from the combined stream 50.1, 52. The combined substreams 50.3, 58.2 enter a pair of sectors 62 in the passage 16 at the compressor 20, on the sides of the sectors 60 remote from the sector 54. Once again, the sector 62 is shown as a single sector in FIG. 2.

The combined substreams 50.3, 58.2, as described for the combined stream 50.1, 52, pass along the passage 16 away from its narrow portion 16.1, through the heat exchanger 22 and into the separator 24. The sectors of the heat exchanger 22 and separator 24 through or into which the combined substreams 50.3, 58.2 pass are designated 62.1. Once again, in FIG. 2, this pair of sectors is indicated as a single sector for the heat exchanger 22 and separator 24. Each combined substream 50.3, 58.2 enters the elements 26 of one of these sectors 62.1 of the separator 24, via the inlets 26.1 thereof.

In said sectors 62.1 of the separator 24, the combined substreams 50.3, 58.2 are each separated into an enriched substream 56.3 and a depleted substream 58.3. The enriched substreams 56.3 pass through the subsidiary outlets of the elements 26 in said sectors 62.1 into the compartment 32, thence via flow connections into the subsidiary duct 34.3 of the outlet duct 34 and thence on to the succeeding module of the series.

The depleted substreams 58.3 pass through the outlets 26.2 of the elements 26 in said sectors 62.1, into the passage 18, respectively on the sides of the substreams 58.2, remote from the stream 58.1.

The substreams 58.3 pass along the passage 18 respectively on the sides of the substreams 58.2, remote from the stream 58.1; and the substreams 58.3 are deflected by the deflector plates at 44 so that they pass further along the passage 18 on the sides of the combined substreams 58.2, 50.3 remote from the combined substreams 58.1, 50.2. Said substreams 58.3, after they pass over the deflector plates at 44 are located adjacent each other to form a single stream 58.3. Where the stream 58.3 passes radially inwardly of the duct 40 it receives the enriched stream 50.4 from the subsidiary duct 40.4, via the flow connection 42. The enriched stream 50.4 has substantially the same isotopic composition as the combined stream 58.3.

The combined stream 50.4, 58.3, as described for the combined stream 50.1, 52, flows axially along the passage 18 towards the narrow end 14.1 of the housing 14. The combined stream 50.4, 58.3 enters the compressor 20, where it flows along a sector 64, between the sectors 62. Said combined stream 50.4, 58.3 then passes along the passage 16 away from its narrow portion 16.1, through the heat exchanger 22 and into the separator 24. The sectors of the heat exchanger 22 and separator 24 through or into which the combined stream 50.4, 58.3 passes are designated 64.1.

In said sector 64.1 of the separator 24 the combined stream 50.4, 58.3 is separated into an enriched substream 56.4 and a depleted substream 58.4. The enriched substream 56.4 passes through the subsidiary outlets of the elements 26 in the sector 64.1 into the compartment 32, thence via a flow connection into the subsidiary duct 34.4 of the outlet duct 34, and thence on to the succeeding module of the series.

The depleted stream 58.4 passes through the outlets 26.2 of the elements 26 in said sector 64.1, and into the passage 18 between the substreams 58.3. The stream 58.4 passes a short distance along the broad portion of the passage 18, and then passes into the main outlet 38 along which it passes to the preceding module in the series.

It will be appreciated that the stream 58.4 passing along the outlet 38 has the same function in the preceding module in the series, as the stream 52 entering the apparatus 10 through the inlet 36. Likewise streams 56.1 to 56.4, which pass as substreams along the subsidiary ducts 34.1 to 34.4 of the duct 34, are treated in the same way and have the same function in the succeeding module of the series, as the substreams 50.1 to 50.4 entering the apparatus 10 through the subsidiary ducts 40.1 to 40.4 of the duct 40.

When the combined stream 50.1, 52, the combined substreams 50.2, 58.1, the combined substreams 50.3, 58.2 and the combined stream 50.4, 58.3 pass along the passages 16, 18 in an axial direction alongside one another, they move along said passages with substantially no mixing except a small amount of diffusion at their interfaces. There is also no substantial mixing when said streams and substreams pass through the compressor 20. It will thus be appreciated that, in the apparatus 10, the various streams and substreams are fed into the passage 18, in the zone of said passage at which are located the inlet 36, the duct 40 and the deflector plates at 44, so that the composition of the total stream flowing along the passage 18 varies in desired fashion over its axial cross-section transverse to the direction of movement of said total stream along the passage. There is in fact a change in composition in opposite circumferential directions from the main inlet 36 to the main outlet 38. Said change in composition is with respect to the isotopic composition of the gas as expressed by the concentration of the first or desired component. The total stream flowing along the passages 18 and 16 is caused to move along said circuit by the compressor 20, the variation in composition over its cross-section remaining substantially unchanged. Each time the total stream passes through the heat exchanger 22, heat is withdrawn from it; and each time it passes respectively through the separator 24 and under the duct 40, material is removed from and added to it. The concentration of the desired component increases steadily in a circumferential direction from a minimum at the main outlet 38 to a maximum at the main inlet 36. The composition of the total stream in the passages 18, 16 thus varies in a circumferential direction, the minimum being diametrically opposed to the maximum, with respect to the isotopic composition of the gas.

It will be appreciated that, immediately downstream of the deflector plates at 44 and the flow connections 42, the variation in composition of the total stream passing along the passage 18 will be somewhat stepwise, there being step-like differences in composition between the combined stream 50.1, 52 and the combined substreams 50.2, 58.1; between the combined substreams 50.2, 58.1 and the combined substreams 50.3, 58.2; and between the combined substreams 50.3, 58.2 and the combined stream 50.4, 58.3. The step character of this variation will decrease as mixing by diffusion takes place at the interfaces between the streams and substreams as they pass along the passage 18 and passage 16. The step character will be most pronounced between the stream 52 and the substreams 58.1 and will decrease between adjacent streams in a circumferential direction so that the step difference in composition between the stream 58.4 and the substreams 58.3 will be the least pronounced. The additions of the streams 50.1 to 50.4 via the duct 40 tend to retard the disappearance of the step-like differences. Thus, as said streams and substreams pass along the circuit from the inlet 36 to the outlet 38, variation will become less steplike and will tend more to a continuous variation from the minimum towards the maximum. When the total stream passes through the compressor 20, it will be rotated in the direction of rotation of the compressor blades 20.2, but the minimum and maximum will remain diametrically opposed to each other, and the variation of the composition of the stream will remain substantially unchanged.

As the total stream passes through the compressor 20 in the passage 16 it is compressed; as it passes through the heat exchanger 22 its temperature is changed; and as it passes through the elements 26 fluid is removed from it by the elements, to form the enriched streams 56.1 to 56.4. The depleted streams and substreams 58.1 to 58.4 passing out of the various sectors of the separator 24 into the passage 18 thus have different isotopic compositions from the various combined streams and substreams entering the same sectors of the separator 24 from the passage 16. The total stream passing through the separator into the passage 18 can thus be regarded as having its composition changed with respect to the concentration of desired component, by having fluid removed therefrom when it passes through the separator 24. Furthermore, it will be appreciated that fluid is added to the total stream flowing along the passage 18 via the inlet 36 and the duct 40; and fluid is removed from the passage 18 via the main outlet 38.

Fluid flow along the passage 18 is diverted by the deflector plates at 44 in the passage 18. As the total stream passes over the deflector plates at 44, the isotopic composition thereof has its variation over its cross-section maintained while withdrawal and addition of fluid respectively via the ducts 38 and 36 take place. The total stream flowing along the passages changes its direction of flow at both ends of the apparatus 10, where it passes from the passage 18 into the passage 16, and where it passes from the passage 16 into the passage 18. It thus flows along a circuit.

Fluid flow along the circuit can be described as starting through the main inlet 36, the flow being added to via the flow connection 42 from the subsidiary duct 40.1. The combined stream 50.1, 52 moves along the circuit to the separator 24, where it is depleted by the elements 26. The remainder of said stream, i.e. the depleted stream 58.1, continues to flow along the circuit until it reaches the deflector plates at 44. It is then diverted into two parts, i.e. the substreams 58.1, which continue to flow around the circuit. They are added to from the duct 40.2 via the flow connections at 42 and the combined substreams 58.1, 50.2 once again flow along the circuit to the separator 24 where they are further depleted. The depleted substreams 58.2 follow a similar cycle around the circuit, being added to at the flow connections 42 by the stream 50.3 from the subsidiary duct 40.3. Combined substreams 50.3, 58.2 then flow along to the separator 24 where they are further depleted to provide the depleted stream 58.3. The stream 58.3 is added to via the flow connection at 42 by the stream 50.4 from the subsidiary duct 40.4. The combined stream 50.4, 58.3 makes a final circuit of the apparatus to the separator 24 where it is finally depleted. The depleted stream 58.4 then passes out of the main outlet 38. From the aforegoing it will be appreciated that the stream 52 entering through the main inlet 36 makes a circuit of the apparatus 10 through the sectors 54, 54.1 after which it is split into two streams. These streams follow helical paths around the circuit made up by the passages 18, 16, the paths moving circumferentially oppositely away from each other and passing respectively in turn through the pairs of sectors 60, 60.1, and the pairs of the sectors 62, 62.1. This is most clearly seen in FIG. 3. The paths move away from each other until they finally converge and become a single path in the sectors 64, 64.1 before passing out of the main outlet 38. The paths, in said circumferential direction, are such that the axes of their helices extend oppositely along two halves of a circle along arrows 65 (FIG. 3A) from the inlet 36 to the outlet 38.

It will be appreciated that, at the inlet to the passage 16 at the compressor 20, the total stream flowing into the passage 16 can be regarded as a plurality of different substreams of fluid having different compositions entering the passage 16. They are moved along the passage by the compressor 20 and are separated physically from one another in the separator 24. They may be regarded as being reintroduced into the circuit when they pass, depleted, out of the separator 24 into the passage 18. The stream 58.4 is finally separated physically from the other streams (58.1, 58.2 and 58.3) where it is removed from the circuit via the outlet 38.

Figure 2:
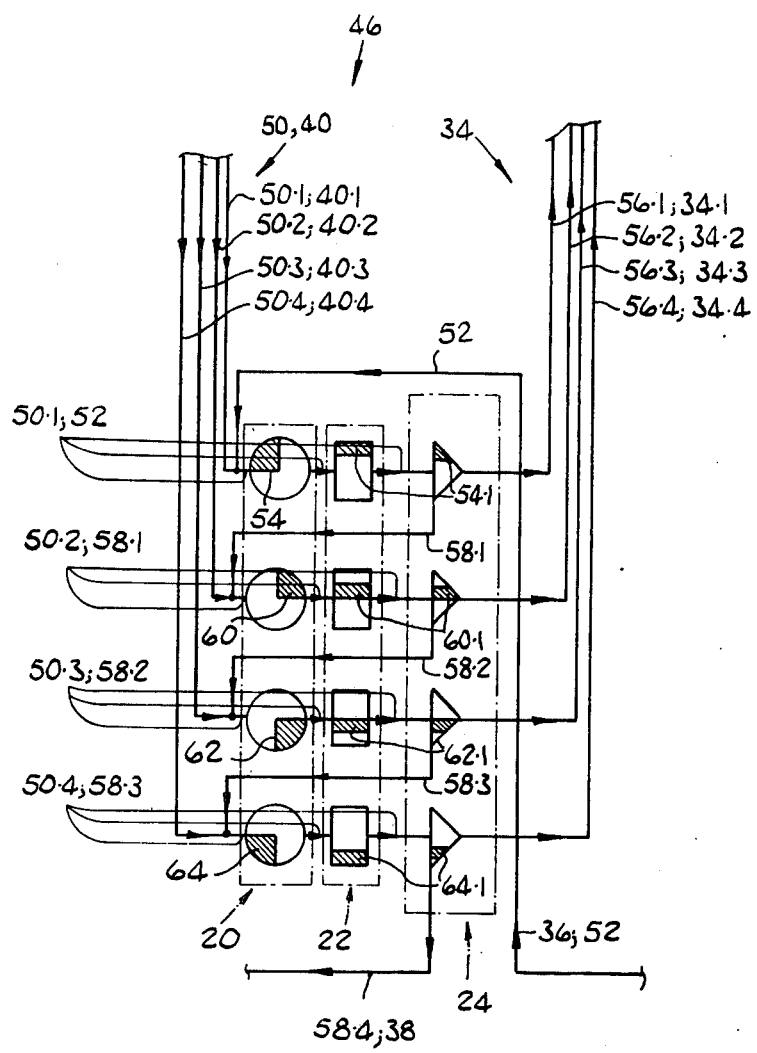
FIG. 2 shows a flow diagram of the apparatus of FIG. 1.
Figure 3:
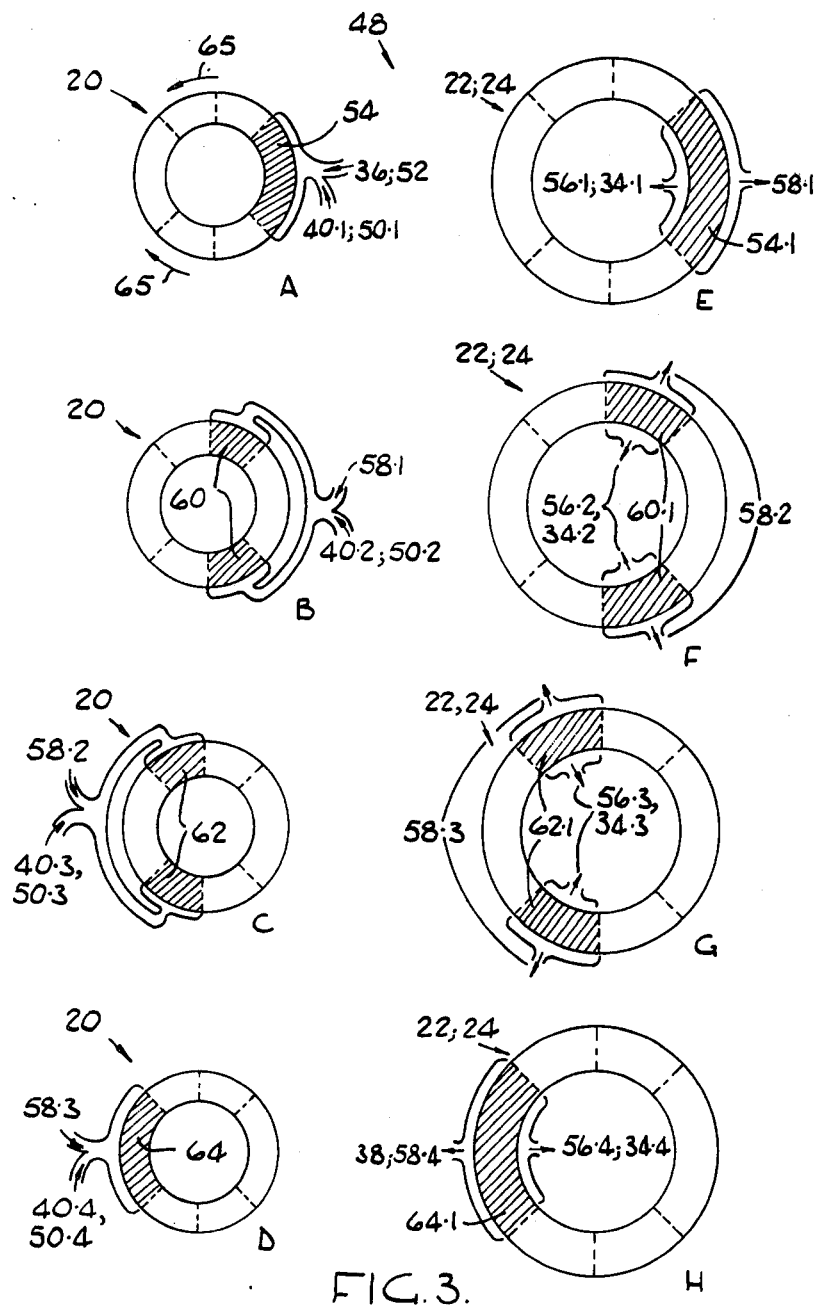
FIGS. 3A to 3H show diagrammatically flows through various cross-sections of the apparatus of FIG. 1.

If reference is again made to FIG. 1A, and it is compared with FIGS. 2 and 3, the following correspondence becomes apparent:

The module exemplified by the apparatus 10 of FIG. 1 is capable of, inter alia, accommodating four stages 2, i.e. one of the groups 9, shown in FIG. 1A;

the stages 2 of a group 9 of FIG. 1A are shown in FIGS. 2 and 3 as the sets of sectors 54, 54.1; 60, 60.1; 62, 62.1; and 64, 64.1 respectively;

the enriched streams 7 of FIG. 1A can be regarded as the enriched substreams 56.1 to 56.4 of FIGS. 2 and 3;

the depleted streams 8 of FIG. 1A can be regarded as the depleted substreams 58.1 to 58.4 of FIGS. 2 and 3; and there is further correspondence, in the stages 2, between the compressors 5 (FIG. 1A) and the compressor 20 (FIGS. 1 to 3); and between the heat exchangers 4 (FIG. 1A) and the heat exchanger 22 (FIGS. 1 to 3). Thus the module 10 of FIGS. 1 to 3 when used as shown in FIGS. 2 and 3 accommodates a group 9 of stages 2 (FIG. 1A). Thus a single compressor 20 and heat exchanger 22 (FIG. 1) are used instead of the four compressors 5 and four heat exchangers 4 of a group 9 of FIG. 1A. Furthermore, a single assembly of elements 26, as embodied by the separator 24, is used instead of the four individual separators 3 of FIG. 1A. In this regard it will be appreciated that, to obtain the correspondence between the FIGS. 1A and 1, 2 and 3, elements 26 are contemplated for use in all the modules 10 of the cascade arrangement, which elements 26 have a cut of 1/5 with respect to the process gas.

In the illustrations in FIGS. 1, 2 and 3, the stream 52, with the various additions thereto and therefrom, can be regarded as making four passes through the apparatus, respectively through the sectors 54, 54.1, the sectors 60, 60.1, the sectors 62, 62.1, and the sectors 64, 64.1.

Figure 4:
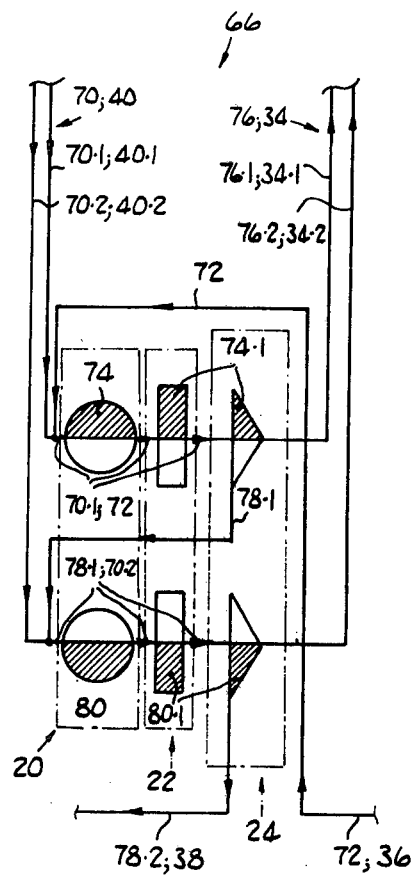
FIG. 4 shows a flow diagram for apparatus similar to that of FIG. 1 but adapted to have a lesser degree of circulation than that of FIG. 1.
Figure 5:
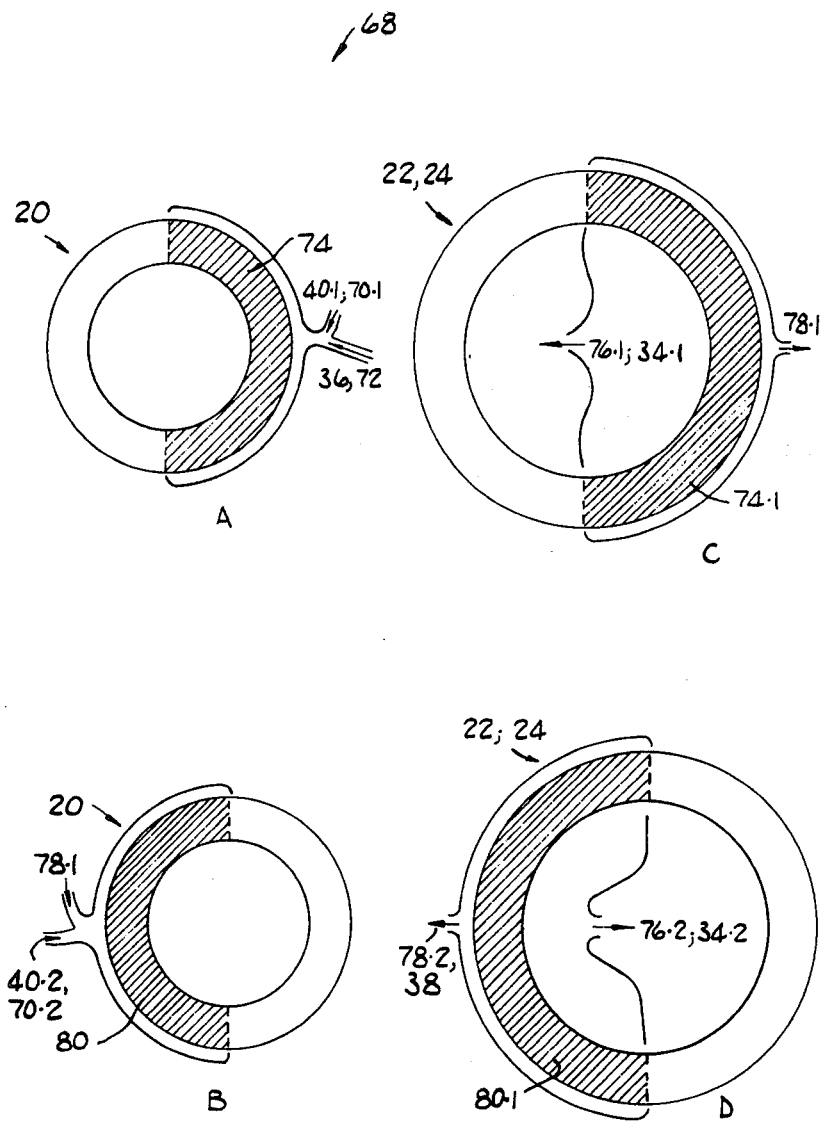
FIGS. 5A to 5D show views similar to those of FIGS. 3A to 3H, for the flow diagram of FIG. 4.

In FIG. 4, reference numeral 66 generally designates a flow diagram for apparatus similar to that of FIG. 1, but adapted to have a lesser degree of circulation than that of FIG. 1. In FIG. 5 reference numeral 68 generally designates views corresponding to those of FIGS. 3A to 3H for the apparatus having the flow diagram of FIG. 4.

An enriched stream 70 from the preceding module but one in the series enters the apparatus for FIG. 4 in the form of a pair of substreams 70.1, 70.2, through the duct 40 which will have two subsidiary ducts 40.1, 40.2. There will thus be two flow connections at 42, one for the duct 40.1 downstream of the inlet 36, and the other for the duct 40.2 at a diametrically opposed position into the passage 18 downstream of the outlet 38. A depleted stream from the succeeding module in the series enters in the form of a stream 72 through the inlet 36. The stream 72 makes two passes through the apparatus, instead of the four shown in FIG. 2. The first pass is through a sector 74 of the compressor 20, and sectors 74.1 of the heat exchanger 22 and separator 24. The stream 72 is combined, prior to said pass through the sectors 74, 74.1, with the substream 70.1 from the subsidiary duct 40.1. After the combined stream 70.1, 72 passes through the separator 24 and, as described hereunder, becomes a depleted stream 78.1, it is deflected once at 44 by the deflector plates to the diametrically opposite side of the passage 18.

The combined stream 70.1, 72 in the sector 74.1 of the separator 24 is divided into an enriched stream 76.1 which passes to the succeeding module but one in the series via the subsidiary duct 34.1 of the outlet duct 34, and a depleted stream 78.1. In the elements 26 of the sector 74.1 (and the sector 80.1 discussed hereunder) there is a cut of 1/5 with respect to process gas. The duct 34 comprises a pair of subsidiary ducts 34.1, 34.2 leading to the succeeding module but one in the series. The depleted stream 78.1, as described above, in passing over the deflector plates at 44 is diverted to a diametrically opposed position in the passage 18. This stream 78.1 is added to by the substream 70.2 from the subsidiary duct 40.2 and makes a second pass along the circuit through the compressor 20, heat exchanger 22 and separator 24. It passes through the sector 80 of the compressor 20 and the sectors 80.1 of the heat exchanger 22 and separator 24. In the sector 80.1 of the separator 24 isotopic separation takes place into an enriched stream 76.2 which passes out through subsidiary duct 34.2 and a depleted stream 78.2. The depleted stream 78.2 passes via the outlet 38 to the preceding module in the series, and the enriched stream 76.2 passes on to the succeeding module but one in the series. Thus, the sectors 74, 74.1 and 80, 80.1 are substantially 180° sectors; whereas in the case of FIGS. 2 and 3 the sectors 54, 54.1 and 64, 64.1 are 90° sectors, the sectors 60, 60.1 and 62, 62.1 being 45° sectors.

Figure 6:
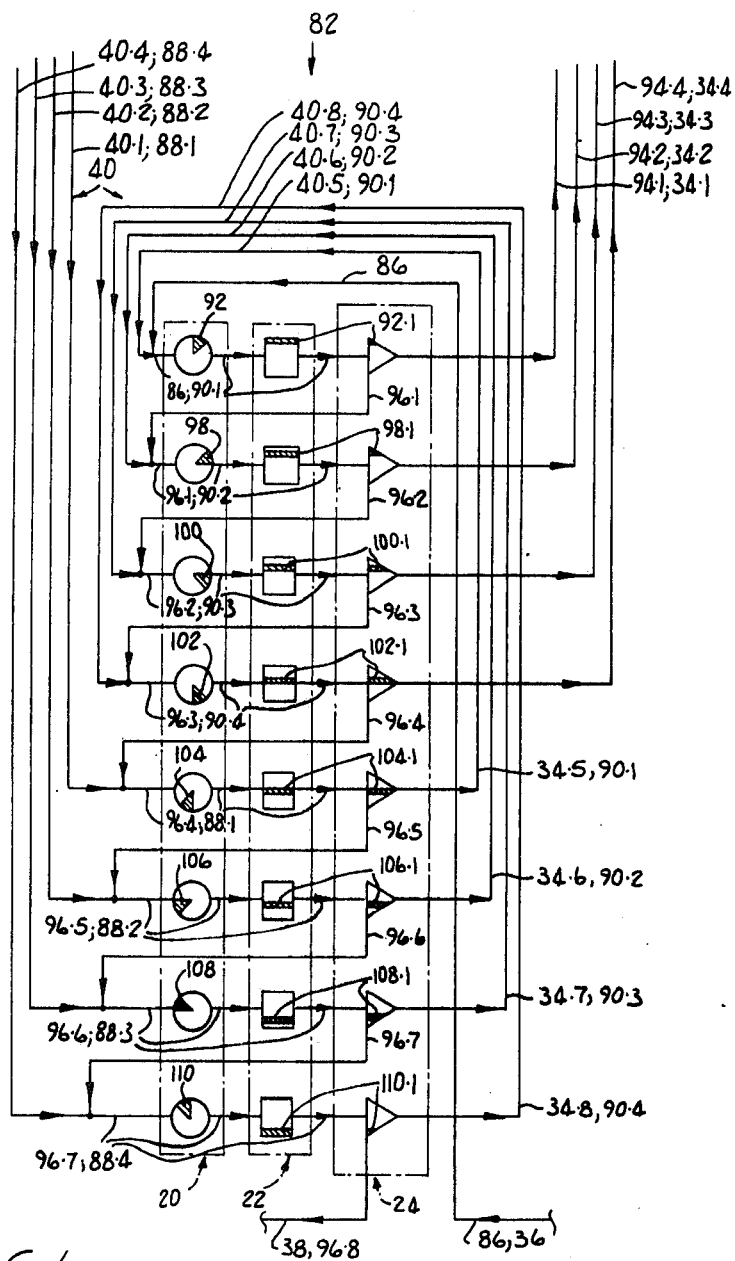
FIG. 6 shows a flow diagram for apparatus similar to that of FIG. 1 but adapted to have a greater degree of circulation than the apparatus of FIG. 1.
Figure 7:
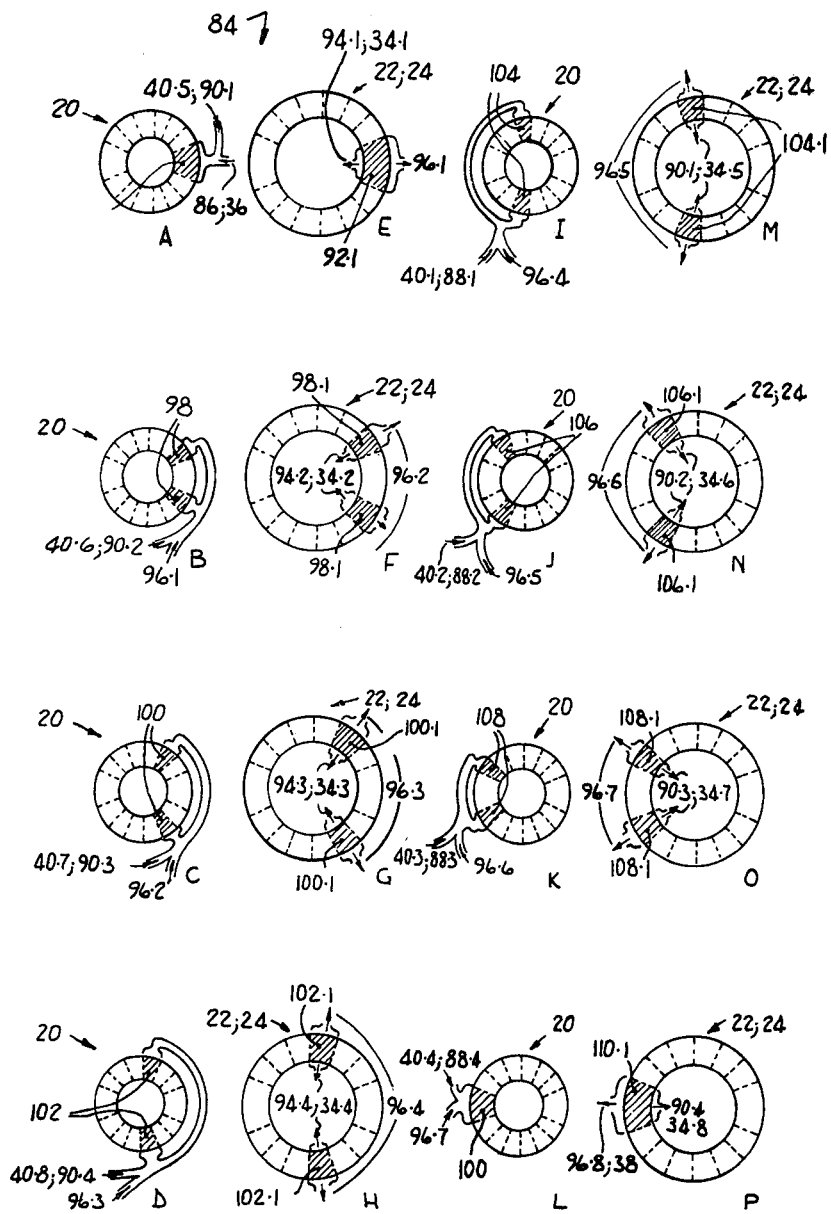
FIGS. 7A to 7P show views corresponding to those of FIGS. 3A to 3H, for the flow diagram of FIG. 6.

In FIG. 6 reference numeral 82 generally designates a flow diagram for apparatus similar to that of FIG. 1 but adapted to have a greater degree of circulation than the apparatus 10 of FIG. 1. In FIG. 7, reference numeral 84 generally designates views corresponding those of FIGS. 3A to 3H for the flow diagram of FIG. 6.

The construction and function of the apparatus 10 which the flow diagrams of FIG. 6 and FIG. 7 represent, are similar in principle to those of the apparatus for FIGS. 1, 2 and 3. The main difference is that the deflector plates at 44 are arranged so that a depleted stream 86 from the succeeding module in the series makes eight passes through the compressor 20, heat exchanger 22 and separator 24, before it exits through the main outlet 38. The duct 40 has eight subsidiary ducts 40.1 to 40.8 and the duct 34 has eight subsidiary ducts 34.1 to 34.8. Subsidiary ducts 40.1 to 40.4 of the duct 40 carry four streams 88.1 to 88.4 from the preceding module in the series, and the subsidiary ducts 34.1 to 34.4 of the duct 34 carry four enriched streams to the succeeding module in the series. The subsidiary ducts 34.5 to 34.8 of the duct 34 are connected directly to the subsidiary ducts 40.5 to 40.8 of the duct 40. This connection is shown diagrammatically in FIG. 1 in broken lines at 89.

The sequence of flow is as follows:

(a) The stream 86 enters the passage 18 through the inlet 36. The stream 86 is added to by a stream 90.1 from the subsidiary duct 40.5 of the duct 40. The stream 90.1 has substantially the same isotopic composition as the stream 86. The combined stream 86, 90.1 circulates along the circuit defined by the passages 18, 16 in the direction described with reference to FIGS. 1, 2 and 3, and enters the compressor 20. It passes through a 45° sector 92 of the compressor 20, and through two 45° sectors 92.1 respectively of the heat exchanger 22 and separator 24. The combined stream 90.1, 86 in the elements 26 of the sector 92.1 of the separator 24 is divided into an enriched stream 94.1 which passes from said elements 26 into the compartment 32 and then from said sector 92.1 of the compartment 32 via a flow connection into the subsidiary duct 34.1; and a depleted stream 96.1 which passes from the main outlets 26.2 of said elements 26 into the passage 18.

(b) The depleted stream 96.1 is divided into a pair of substreams by the deflector plates at 44, which flow along the passage 18 towards its narrow portion 18.1 on opposite sides of the inlet 36 and stream 86. Said substreams 96.1 pass under the duct 40, where they receive parts of a stream 90.2 from the subsidiary duct 40.6 via the flow connections 42. The combined substreams 90.2, 96.1 circulate along the circuit on opposite sides of the combined stream 90.1, 86 and pass through a pair of 22½° sectors 98 in the compressor 20, and pairs of 22½° sectors 98.1 in the heat exchanger 22 and separator 24 respectively. The sectors 98 are on opposite sides of the sector 92; and the sectors 98.1 are on opposite sides of the sector 92.1 in the heat exchanger 22 and separator 24. In the elements 26 of the sectors 98.1 of the separator 24 isotopic separation takes place and said combined substreams 90.2, 96.1 are divided into enriched substreams 94.2 which pass from the subsidiary outlets of the elements 26 into the compartment 32 and then through flow connections from the sectors 98.1 of the compartment into the subsidiary duct 34.2 of the duct 34; and depleted substreams 96.2 which pass from the main outlets 26.2 of the elements 26 into the passage 18.

(c) The depleted substreams 96.2 pass along the passage 18 on opposite sides of the depleted stream 96.1 until they reach the deflector plates at 44, where they are deflected so that they pass further along the passage 18 towards the narrow portion 18.1 of the passage 18 on the sides of the substreams 96.1 remote from the stream 86. Where the substreams 96.2 pass under the duct 40 they receive via flow connections 42 from the subsidiary duct 40.7 parts of a stream 90.3 at substantially the same isotopic composition. Combined substreams 90.3, 96.2 pass along the circuit on the sides of the combined substreams 90.2, 96.1 remote from the combined stream 90.1, 86. Said combined substreams 90.3, 96.2 enter further 22½° sectors 100 in the compressor 20 on the sides of the sectors 98 remote from the sector 92. The combined substreams 96.2, 90.3 then pass through pairs of 22½° sectors 100.1 in the heat exchanger 22 and separator 24 respectively. The sectors 100.1 in the heat exchanger and separator are on the sides of the sectors 98.1 remote from the sector 92.1. In the elements 26 of the sectors 100.1 of the separator 24 an isotopic separation takes place and said combined substreams 90.3, 96.2 are divided into enriched substreams 94.3 which pass from the subsidiary outlets of the element 26 into the compartment 32 and then through flow connections from the sectors 100.1 of the compartment 32 into the subsidiary duct 34.3 of the duct 34; and depleted substreams 96.3 which pass from the main outlets 26.2 of the elements 26 into the passage 18, on the sides of the substreams 96.2 remote from the stream 96.1.

(d) The depleted substreams 96.3 flow along the passage 18 towards its narrow portion 18.1 on the sides of the depleted substreams 96.2 remote from the depleted stream 96.1. The depleted substreams 96.3 are deflected by the deflector plates at 44 so that they continue to flow along the passage 18 alongside the depleted substreams 96.2. Where the substreams 96.3 pass under the duct 40 they receive, via flow connections 42 from the subsidiary duct 40.8, parts of a stream 90.4 at substantially the same isotopic composition. The combined substreams 90.4, 96.3 circulate along the circuit along the sides of the combined substreams 96.2, 90.3 remote from the combined substreams 96.1, 90.2 and pass through a pair of 22½° sectors 102 in the compressor 20, and pairs of 22½° sectors 102.1 respectively in the heat exchanger 22 and separator 24. In the elements 26 of the sectors 102.1 of the separator 24 an isotopic separation takes place and said combined substreams 90.4, 96.3 are divided into enriched substreams 94.4 and depleted substreams 96.4. The enriched substreams 94.4 pass through the subsidiary outlets of said elements into the compartment 32 and from the sectors 102.1 of the compartment 32 via flow connections into the subsidiary duct 34.4 of the duct 34. The depleted substreams 96.4 pass into the passage 18 via the main outlets 26.2 of the elements 26, on the sides of the depleted substreams 96.3 remote from the depleted substreams 96.2. The depleted substreams 96.4 flow along the passage 18 to the deflector plates at 44 where they are deflected to pass further along the passage 18 along the sides of the depleted substreams 96.3 remote from the depleted substreams 96.2.

(e) Where the depleted substreams 96.4 pass under the duct 40 they receive, via flow connections 42 from the subsidiary duct 40.1 of the duct 40, parts of the stream 88.1, at substantially the same isotopic composition, from the preceding module in the series. The combined substreams 96.4, 88.1 circulate along the circuit along the sides of the combined substreams 96.3, 90.4 remote from the combined substreams 96.2, 90.3. Combined substreams 96.4, 88.1 pass through a pair of 22½° sectors 104 in the compressor 20, alongside the sectors 102. They then pass through a pair of 22½° sectors 104.1 in the heat exchanger 22 and into a pair of 22½° sectors 104.1 in the separator 24. In the elements 26 of the sectors 104.1 of the separator 24 an isotopic separation takes place and said combined substreams 96.4, 88.1 are divided into enriched substreams 90.1 and depleted substreams 96.5. The enriched substreams 90.1 pass from the subsidiary outlets of the elements 26 into the compartment 32 and thence from the sectors 104.1 of the compartment 32 via flow connections into the subsidiary duct 34.5 of the duct 34. Depleted substreams 96.5 pass from the main outlets 26.2 of the elements 26 into the passage 18 alongside the depleted substreams 96.4, on the sides of the depleted substreams 96.4 remote from the depleted substreams 96.3. The depleted substreams 96.5 then pass along the passage 18 along the sides of the depleted substreams 96.4 remote from the depleted substreams 96.3 to the deflector plates at 44. At the deflector plates the depleted substreams 96.5 are deflected, so that they continue to pass along the passage 18 alongside the depleted substreams 96.4.

(f) Where the depleted substreams 96.5 pass under the duct 40 they receive, via flow connections 42 from the subsidiary duct 40.2, parts of a stream 88.2 from the preceding module of the series, at substantially the same isotopic composition. The combined substreams 96.5, 88.2 flow along the passage 18, to the compressor 20. The combined substreams 88.2, 96.5 pass through a pair of 22½° sectors 106 in the compressor 20, alongside th sectors 104. Combined substreams 96.5, 88.2 then pass along the passage 16 through 22½° sectors 106.1 in the heat exchanger 22 alongside the sectors 104.1, and then into 22½° sectors 106.1 of the separator 24 alongside the sectors 104.1. In the elements 26 of the sectors 106.1 of the separator 24 an isotopic separation takes place and said combined substreams 96.5, 88.2 are divided into a pair of enriched substreams 90.2 and a pair of depleted substreams 96.6. The enriched substreams 90.2 pass through the subsidiary outlets of the elements 26 into the compartment 32, and then through flow connections from the sectors 106.1 of the compartment 32 into the subsidiary duct 34.6 of the duct 34. The depleted substreams 96.6 pass into the passage 18 and along the passage 18 alongside the depleted substreams 96.5 and on the sides thereof remote from the depleted substreams 96.4. At the deflector plates at 44 the depleted substreams 96.6 are deflected to continue to pass along the passage 18 alongside the depleted substreams 96.5.

(g) Where the depleted substreams 96.6 pass under the duct 40 they receive, via flow connections 42 from the subsidiary duct 40.3, parts of a stream 88.3 of gas from the preceding module in the series, at substantially the same isotopic composition. The combined substreams 96.6, 88.3 pass along th passage 18 to the compressor 20. Said combined substreams 96.6, 88.3 pass through a pair of 22½° sectors 108 of the impeller 20, alongside the sectors 106. Combined substreams 96.6, 88.3 then pass through a pair of 22½° sectors 108.1 of the heat exchanger 22 alongside the sectors 106.1 thereof, and into a pair of 22½° sectors 108.1 of the separator 24 alongside its sectors 106.1. In the elements 26 of the sectors 108.1 of the separator 24 an isotopic separation takes place and said combined substreams 96.6, 88.3 are divided into a pair of enriched substreams 90.3, and a pair of depleted substreams 96.7. The enriched substreams 90.3 pass from the subsidiary outlets of the elements 26 into the compartment 32 and then through flow connections from said sectors 108.1 of the compartment 32 into the subsidiary duct 34.7 of the duct 34. The depleted substreams 96.7 pass into and flow along the passage 18 alongside the depleted substreams 96.6 on the sides thereof remote from the depleted substreams 96.5 to the deflector plates at 44. The deflector plates deflect the depleted substreams 96.7 so that they continue to flow along the passage 18 alongside the depleted substreams 96.6.

(h) Where the substreams 96.7 pass under the duct 40 they receive via flow connections 42 from the subsidiary duct 40.4 parts of a stream 88.4 from the preceding module of the series, at substantially the same isotopic composition. The combined substreams 88.4, 96.7 then flow along the passage 18 towards the compressor 20. It will be apparent that, once the depleted substreams 96.7 pass over the deflector plates at 44, they are combined in a single depleted stream which flows along the passage 18 alongside and between the depleted substreams 96.6. The combined stream 88.4, 96.7 passes through a 45° sector 110 in the compressor 20. Said combined substream 96.7, 88.4 then passes through a 45° sector 110.1 in the heat exchanger 22 and enters a 45° sector 110.1 in the separator 24. The sector 110 is between the sectors 108 and the sectors 110.1 are respectively between the pairs of sectors 108.1 in the heat exchanger 22 and separator 24. In the elements 26 of the sector 110.1 of the separator 24 isotopic separation takes place and said combined stream 96.7, 88.4 is divided into an enriched stream 90.4 and a depleted stream 96.8. The enriched stream 90.4 passes through the subsidiary outlets of the elements 26 into the compartment 32 and then through a flow connection from the sector 110.1 of the compartment 32 into the subsidiary duct 34.8 of the duct 34. The depleted stream 96.8 passes from the main outlets 26.2 of the elements 26 in the sector 110.1 of the separator 24 into the passage 18 between the depleted substreams 96.7. Said depleted substream 96.8 passes along a single sector of the passage 18 between the depleted substreams 96.7, and passes out of the main outlet 38.

It will be appreciated that, as in FIGS. 2 and 4, the pairs of sectors 98, 100, 102, 104, 106, 108, and the pairs of sectors 98.1, 100.1, 102.1, 104.1, 106.1 and 108.1 are shown for clarity in FIG. 6 as a single sector. The various isotopic compositions of the streams flowing through the apparatus for the flow diagram 82 are arranged so that the enriched streams 90.1 to 90.4 have substantially the same isotopic composition respectively as the stream 86 and the depleted streams 96.1 to 96.3. The flow of the streams 90.1 to 90.4 from the subsidiary ducts 34.5 to 34.8 and into the subsidiary ducts 40.5 to 40.8 amounts to an internal circulation regarding the apparatus 82. The enriched streams 94.1 to 94.4 correspond to the streams 88.1 to 88.4 and pass on to a succeeding module in the series. The depleted stream 96.8 corresponds to the stream 86, and passes on to a preceding module in the series.

As with FIGS. 2 and 3, all the elements 26 of FIG. 1 described with reference to FIGS. 4 to 7 have a cut of 1/5 with respect to the process gas.

Correspondence between FIGS. 4 and 5 and FIG. 1A is as follows:

The module 10 of FIG. 1, for FIGS. 4 and 5, accommodates two stages 2 (FIG. 1A) i.e. a group of half as many stages 2 as each of the groups 9 of FIG. 1A (or half such a group 9);

the two stages 2 (FIG. 1A) forming the group of FIGS. 4 and 5 are shown in FIGS. 4 and 5 respectively as the sets of sectors 74, 74.1; and 80, 80.1;

the feed streams 6 of FIG. 1A can be regarded as the streams 70.1, 72; and 70.2, 78.1 of FIGS. 4 and 5;

the enriched streams 7 of FIG. 1A can be regarded as the enriched substreams 76.1, 76.2 of FIGS. 4 and 5; and the depleted streams 8 of FIG. 1A can be regarded as the depleted substreams 78.1, 78.2 of FIG. 4.

If reference is made to FIG. 1A, it will also be seen that a module 10 for FIGS. 4 and 5 must receive its feed streams 70.1, 70.2 from the preceding module but one in the series; and its enriched streams 76.1, 76.2 must pass on to the succeeding module but one in the series.

Correspondence between FIGS. 6 and 7 and FIG. 1A is as follows:

The module 10 of FIG. 1, for FIGS. 6 and 7, accommodates eight stages 2 of FIG. 1A, i.e. it accommodates a group of twice as many stages as a group 9 (or two such groups 9) of FIG. 1A;

the eight stages 2 forming the group of FIGS. 6 and 7 are shown in FIGS. 6 and 7 as the sets of sectors 92, 92.1; 98, 98.1; 100, 100.1; 102, 102.1; 104, 104.1; 106, 106.1; 108, 108.1; and 110, 110.1;

the feed streams 6 of FIG. 1A can be regarded as the streams 86, 90.1; 96.1, 90.2; 96.2, 90.3; 96.3, 90.4; 96.4, 88.1; 96.5, 88.2; 96.6, 88.3; and 96.7, 88.4 of FIGS. 6 and 7;

the enriched streams 7 of FIG. 1A can be regarded as the enriched substreams 94.1 to 94.4 and 90.1 to 90.4 of FIGS. 6 and 7; and the depleted streams 8 of FIG. 1A can be regarded as the depleted substreams 96.1 to 96.8 of FIG. 6.

As with FIGS. 2 and 3, there is in FIGS. 1 and 4 to 7 correspondence in the stages 2 between the compressors 5 (FIG. 1A) and the compressor 20 (FIGS. 1 and 4 to 7); and between the heat exchangers 4 (FIG. 1A) and the heat exchangers 22 (FIGS. 1 and 4 to 7). Thus the module 10 of FIG. 1, when used as shown in FIGS. 4 and 5 accommodates half a group 9 (or a group half the size of said group 9) of stages 2 (FIG. 1A). A single compressor 20 and heat exchanger 22 (FIG. 1) are thus used instead of two compressors 5 and heat exchangers 4 (FIG. 1A). Similarly the module 10 when used as shown in FIGS. 6 and 7 accommodates two groups 9 (or a group twice the size of a group 9) of stages 2 (FIG. 1A). The single compressor 20 and heat exchanger 22 thus replaces eight compressors 5 and heat exchangers 4 of FIG. 1A.

Furthermore, with reference respectively to FIGS. 4 and 5 and to FIGS. 6 and 7, a single separator 24 may be used instead of the plurality of separators 3 of FIG. 1A.

The invention has been illustrated with specific reference to apparatus for the isotopic separation of gases. The apparatus 10 forms a module in a cascade-type series of similar apparatus. A single apparatus 10 has been shown in FIG. 1, and it is contemplated that the modules 10 will remain substantially unchanged throughout the cascade arrangement. Thus, in each module the overall dimensions and relative locations of the housings 12, 14, the compressor 20, the heat exchanger 22, the separator 24 and compartment 32, the inlet 36 and outlet 38 and the ducts 34, 40 will remain substantially unchanged. However, as there is progression along the series of modules of the cascade, from the inlet feed stream of the cascade towards either the final outlet enriched stream or the final outlet depleted stream, mass flow rates in forward and reverse directions along the cascade will diminish. Thus several sets of modules 10 may be required to handle the total mass flow rates of a group 9 of four stages in a block near the feed stream of the cascade. In an intermediate position in the cascade, a single module 10 may be able to handle the total mass flow of a group 9 of four stages; and near the final outlet enriched or depleted stream of the cascade, a single module 10 may be able to handle more than the total mass flow of a group 9 of four stages.

As shown in FIGS. 2 and 3, a module 10 can accommodate a group 9 of four stages in a block 1 of a cascade arrangement, which group 9 receives four enriched streams (50.1 to 50.4) from the preceding module or group, and which receives a single depleted stream (52) from the succeeding module or group in the series. This demonstrates a possible intermediate module in the cascade arrangement.

In FIGs. 4 and 5, on the other hand, flow diagrams are shown for a module 10 receiving two enriched streams 70.1 and 70.2 from the preceding module but one, and a depleted stream 72 from the succeeding module. FIGS. 4 and 5 may thus be for a module near the beginning of the cascade arrangement, where the apparatus 10 is able to handle about half the total mass flow of a group 9 of four stages. There may thus be two sets of apparatus 10, forming a group 9 (FIG. 1A) of stages, to handle the total mass flow. The enriched streams (four) from the preceding group of stages will flow into said two modules 10; and the depleted stream (one) from the succeeding group 9 of stages will flow into one of the said two modules 10. The module 10 of FIG. 1, with reference to FIGS. 1A, 4 and 5, thus accommodates half a group 9.

In FIGS. 6 and 7, the flow diagrams are shown for a position near the end of the cascade arrangement. The apparatus 10 of FIG. 1, at this position, may be able to handle double the total mass flow. The apparatus 10 thus, for FIGS. 6 and 7, accommodates two groups 9 (FIG. 1A) in the cascade arrangement. In fact the sectors 92, 98, 100 and 102, together with the sectors 92.1, 98.1, 100.1 and 102.1 accommodate a higher group 9 in the module 10, and the sectors 104, 106, 108 and 110, with the sectors 104.1, 106.1, 108.1 and 110.1 accommodate a lower group 9 in the module 10. Thus, said lower group receives four enriched streams (88.1 to 88.4) from the preceding group of stages in the cascade arrangement (in a different module 10) and a depleted stream (96.4) which is in the form of two substreams from said higher group; and its enriched outlet streams (90.1 to 90.4) pass on to said higher group while the depleted outlet stream 96.8 passes on to said preceding group. Correspondingly, the said higher group receives enriched streams (90.1 to 90.4) from said lower group, and depleted stream (86) from the succeeding group (in another module) in the series; and its enriched outlet streams (94.1 to 94.4) pass on to said succeeding group in the series, while its depleted outlet stream (96.4) passes on to said lower group.

Thus as one progresses along the cascade arrangement from its inlet feed stream to its final outlet enriched or depleted stream:

(a) At and near the beginning enriched streams moving forward along the cascade arrangement will pass from a module to the succeeding module but one, each group 9 of four stages 2 being accomodated by as many modules 10 as are required to handle the total mass flow. (FIGS. 4 and 5).

(b) As progress is made along the cascade arrangement the number of modules required to accomodate a group of stages will decrease until a single module (FIGS. 2 and 3) is required to handle the total mass flow; and (c) Towards the end of the cascade arrangement, two or more groups can be accommodated by a single module 10. (FIGS. 6 and 7).

Figure 8:
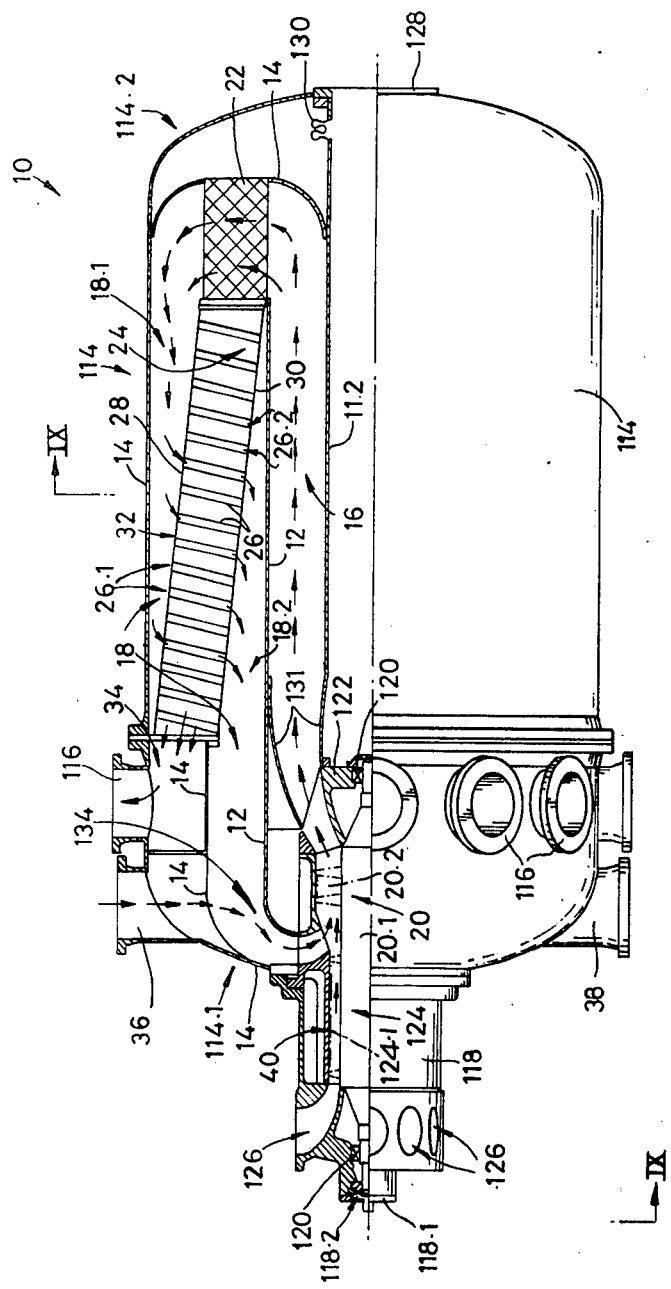
FIG. 8 shows a part sectional side elevation of another apparatus for the treatment of fluid in accordance with the invention in the direction of line VIII—VIII in FIG. 9.
Figure 9:
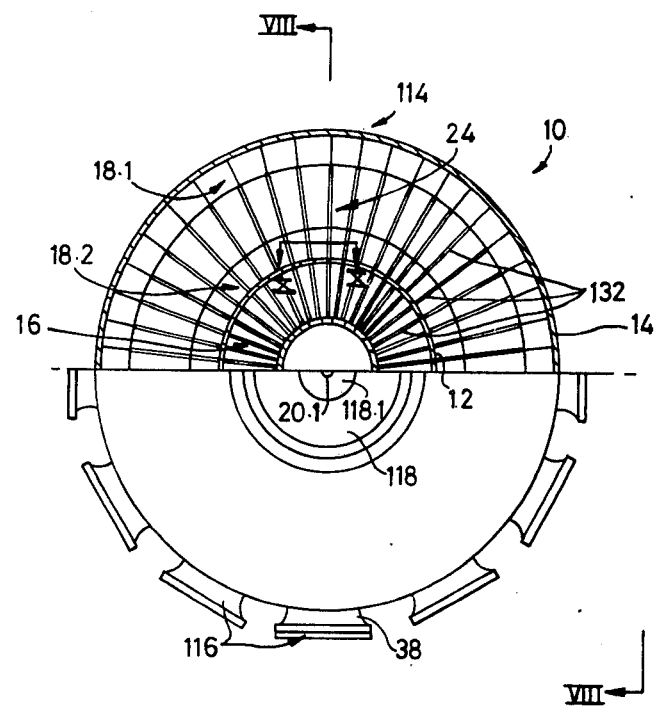
FIG. 9 shows a part sectional end elevation of the apparatus of FIG. 8, in the direction of line IX—IX in FIG. 8.

In FIGS. 8 and 9 another apparatus for treatment of fluid in accordance with the invention is shown. Unless otherwise specified, the same reference numerals are used in FIGS. 8 and 9 as are used in FIG. 1.

Thus, reference numeral 10 generally designates the apparatus, which comprises an inner housing 12 and an outer housing 14 around the inner housing 12. Inside the inner housing 12 is provided a substantially cylindrical core member 112, and the outer housing 14 is enclosed by a cylindrical vessel or tank 114.

The housing 12 and core member 112 are coaxial and define between them the passage 16, which is annular. The housings 12, 14 in turn define between them the passage 18, which is also annular. Opposite ends of the passage 16 open radially into opposite ends of the passage 18. The passages 16, 18 thus define an endless passage or circuit, having an inner annular part formed by the passage 16, and an outer annular part, within which the inner part is located, defined by the passage 18.

The axial flow compressor 20 is located in the passage 16, at one end 114.1 of the tank 114. The compressor 20 has shaft 20.1 and blades 20.2. The shaft 20.1 is coaxial with the passages 16, 18 and projects inwardly, form the exterior of the tank 114, at said end 114.1.

The foraminous heat exchange element 22 is located in the passage 18, at the opposite end 114.2 of the tank 114, where the passage 16 opens radially outwardly into the passage 18. The heat exchanger 22 is annular.

The separator 24 is likewise annular and is located in the passage 18, extending from the heat exchanger 22 towards the end 114.1 of the tank, being truncated-conical in shape and tapering towards the heat exchanger 22. The isotopic gas separation elements 26 corresponding to the elements 26 of FIG. 1, are located in the separator 24.

The part of the passage 18, designated 18.1, between the heat exchanger 22 and separator 24 is located radially outwardly of the separator 24, between the separator and the housing 14. The part of the passage 18, designated 18.2, on the opposite side of the separator 24 from the heat exchanger 22 is located radially inwardly of the separator 24, between the separator 24 and the housing 12.

The elements 26 of the separator 24 have their inlets 26.1 in communication with the passage 18 and directed through the partition 28 into the part 18.1 of the passage 18. The main outlets 26.2 of the separation elements 26 communicate via the partition 30 into the part 18.2 of the passage 18 between the separator 24 and the housing 12.

The compartment 32 which defines the separator 24 has its outlet duct 34 in the form of an annular compartment extending around the housing 14 at the end 114.1 of the tank 114. The subsidiary outlets of the gas separation elements open into the duct 34. The duct 34 has twelve equally circumferentially spaced radially outwardly projecting outlets 116.

The main inlet 36 enters the passage 18 at end 114.1 of the tank 114 axially outwardly of the ring of outlets 116. Diametrically opposite the inlet 36 is provided the main outlet 38, which likewise communicates with the passage 18.

The further inlet duct 40 is annular, and extends around the shaft 20.1 of the compressor 20, axially outwardly of the compressor 20. The duct 40 is defined between a spigot formation 118 projecting coaxially outwardly from the end 114.1 of the tank 114. The spigot formation 118 is bolted to said end of the tank 114, having an end cover 118.1 from which the shaft 20.1 projects axially outwardly, sealing means 118.2 being provided at said end cover 118.1.

Bearings 120 are provided for the shaft 20.1 respectively in the spigot formation 118 and in a mounting formation 122 provided at the end of the core member 112 adjacent the compressor 20.

An axial flow compressor 124 having blades 124.1 mounted on the shaft 20.1 is provided in the duct 40. The duct 40 has twelve inlets 126 which are equally circumferentially spaced and comprise passages in the spigot formation 118, the passages 126 opening radially outwardly. The duct 40 opens axially into the passage 16 where the passage 18 communicates radially with the passage 16 at the end 114.1 of the tank 114.

The end of the core member 112 at the end 114.2 of the tank 114 is connected to a manhole cover 128 by a bellows formation 130 which permits expansion and contraction. A diffusor 131 is provided at the outlet of the compressor 20.

With particular reference to FIG. 9, the passage 16, heat exchanger 22, separator 24 and passage 18 are divided into axially extending compartments by a plurality of radial, axially extending circumferentially spaced partitions 132. There are 48 partitions 132 shown, 48 being typically a suitable number for use with a separator 24 having a cut in the region of about 1/20.

Figure 10:
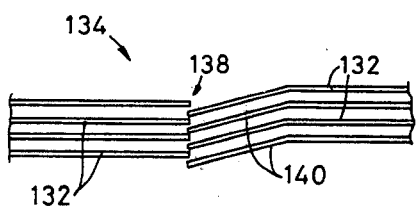
FIG. 10 shows part of the apparatus of FIGS. 8 and 9 in detail, in the direction of line X—X in FIG. 9.

Deflecting means is provided on the partitions, adapted to deflect fluid passing along the circuit defined by the passages 16, 18 in a circumferential direction relative to said passages. The deflecting means is provided in the passage 18 at 134. By way of example, the schematic representation in FIG. 10 shows the deflecting means in the form of bresaks at 138 in the partitions 132, where deflector plates 140, forming part of said partitions 132, are inclined circumferentially relative to the remainder of said partitions, thereby permitting flow from one compartment between a pair of the partitions 132 to another compartment between a different pair of the partitions 132.

The function of the module 10 of FIGS. 8 and 9 is substantially the same as that of the module of FIG. 1. The enriched stream from the previous module or modules in the series, and/or gas which is recirculated from the outlets 116, passes along the duct 40, being in the form of twelve sub-streams entering the duct 40 via the inlets 126. Said enriched stream passes through the compressor 124 and enters the passage 16 upstream of the compressor 20.

The depicted stream from the succeeding module 10 in the series enters the passage 18 via the main inlet 36. This depleted stream passes radially inwardly into the passage 18 and thence into the passage 16 and into the compressor 20. Said depleted stream from the succeeding module passes axially along the passage 16 to the end of the passage at the end 114.2 of the housing 114, occupying its sector of the passage 16. It passes through the heat exchanger 22 into the part 18.1 of the passage 18, thence into the separator 24 and thence the depleted part thereof passes into the part 18.2 of the passage 18, in the direction of the arrows shown, and the enriched part thereof passes into the duct 34.

It will be appreciated that the sector occupied by the depleted stream from the succeeding module entering through the main inlet 36 may be defined by several compartments between partitions 132. At the deflector plates 140 at 134 in the passage 18, said depleted stream is divided into two parts, which continue to flow along the circuit in their appropriate sectors on opposite sides of the first sector occupied by the depleted stream entering though the main inlet 36. In this regard it will be appreciated that the partitions 132 will not be parallel to the polar axis of the module 10 along their full lengths. They will be shaped so that they are inclined to said axis, so that the compartments defined between the partitions discharge into the appropriate sector or sectors of the compressor 20. This arrangement of the partitions is to compensate for the bodily rotation of the stream of gas by the compressor, as it passes through the compressor, about said axis. The said two parts of the depleted stream continue in their flow along their helix-like paths in opposite directions circumferentially around the module 10, as described with reference to FIG. 1, until they eventually come together again and issue from the main outlet 38 in the form of the depleted stream from the module 10 which passes to the previous module in the series.

From a comparison of FIGS. 8 and 9 with FIG. 1, it will be appreciated that the inlets 126 into the duct 40 correspond with the subsidiary ducts 40.1 to 40.4 of FIG. 1, and the outlets 116 from the outlet duct 34 correspond with the subsidiary ducts 34.1 to 34.4 of FIG. 1. The parts of the enriched stream from the previous module which enter the duct 40 via the inlets 126 are arranged so that they are expelled by the compressor 124 into the inlet of the compressor 20 at positions where their isotopic compositions is the same as that of the flow from the duct 18 into the inlet of the compressor 20.

It will thus be appreciated that the module 10 of FIG. 1 may also be provided with partitions similar to the partitions 132 shown in FIGS. 8 and 9. The partitions divide the circuit into a plurality of compartments extending along the circuit. These compartments may, but need not necessarily, correspond to the sectors occupied in the circuit by the various streams and combined streams flowing along the circuit.

The feature of the partitions 132 reduces mixing by diffusion or turbulence at the interfaces of said streams as they flow along the circuit. The more partitions 132 there are, the less mixing takes place. Thus, in general, as many partitions will provided as possible, the total number being limited by practical convenience in construction, and economic considerations.

In general, the steeper the concentration gradient in a circumferential direction in the circuit defined by the passages 16 and 18 the more important are the partitions 132, said partitions, as described above, serving to prevent mixing and to prevent disappearance of the concentration gradient. Thus for a module comprising only a few stages, e.g. 2 stages as shown in FIG. 5, partitions, although desirable, may not be necessary. For modules which comprise a large number of stages, e.g. 10 which may typically be encountered for cuts of about 1/10 or less, partitions become progressively more important.

In the case of FIG. 1, when there are no partitions, the heat exchanger 22 and the tapering portion of the passage 16 preferably have a centrally located axially extending cylindrical core member 112 (broken lines) extending from the shaft 20.1 to the compartment 32, corresponding to the core member 112 of FIGS. 8 and 9. This core member tends to prevent mixing of streams flowing along the passage 16 with streams at diametrically opposed positions.

The examples with reference to FIGS. 1 to 7 have been described with reference to elements 26 in which the cut is 1/5 and in which enriched streams and depleted streams are at the same pressure. In cases where each stage 2 (FIG. 1A) has an enriched stream 7 at a different pressure from that of its depleted stream, it is contemplated that the streams having the lower pressure will be passed through an additional compressor before being added to the other streams, to equalise the pressure of the streams, after which they pass through the common compressor 20 and heat exchanger 22 (FIG. 1). Thus, for example, an additional compressor may be provided in the duct 40 of FIG. 1 when the streams 50 (FIG. 2) are at a lower pressure than the streams 52 and 58; or the additional compressor may be provided in the portion 16.2 of the passage 16 when said streams 50 are at a higher pressure than the streams 52 and 58. In the case of FIGS. 8 and 9, the additional compressor is shown at 124, for circumstances similar to the case where the streams 50 are at a lower pressure than the streams 52 and 58.

Furthermore, it will be appreciated that the module 10 need not be used to accommodate an integral number of groups of stages, or a group or groups comprising an integral number of stages. Thus it is contemplated that the module may be used to accommodate any number of groups or portions thereof, comprising any number of stages or portions thereof. Appropriate flow connections will be provided, as necessary. Thus the method and apparatus are not limited to specific cuts of e.g. a $\frac{1}{3}$, a $\frac{1}{4}$ or a 1/5, and any desired cut down to 1/20 or less may be used.

It will also be appreciated that the deflector plates need not necessarily deflect flow from a given compartment into the adjacent or any other specific compartment. In practice the deflector plates can divert the flow from a compartment by any arbitrary amount, the deflection being sufficient to deflect the flow into the adjacent sector, bearing in mind that the sectors need not correspond with compartments between partitions 132. The amount of diversion by the deflector plates will in fact depend on mass flow balance considerations in the module 10, i.e. on the magnitudes of the depleted stream flowing between modules.

The invention has as an additional advantage the fact that standardization of modules is possible. Furthermore, in isotope separation, compression (passing the stream through a compressor to move the stream) and heat exchange (e.g. cooling the stream after compression) may be required whenever the stream has passed through isotopic separation elements. A further advantage of the invention is thus that each module 10 has a single compressor 20 and heat exchanger 22, for internal circulation, regardless of the number of separate streams of gas moving forward or countercurrent along the cascade arrangement and passing through the module. When necessary, each module also only has a single compresor 124 to equalize pressures between enriched streams entering the module and internal circulating streams. The use of a large number of compressors and heat exchangers (at least one for each stage shown in FIG. 1A) is thus avoided, and use of a relatively small number of identical compressors and heat exchangers is thus made possible. Where partitions are provided, the only parts of the circuit in the module where the various streams and substreams will be in contact with each other will be in the portion of the circuit occupied by the compressor 20 and the portion of the circuit where the deflector plates 140 are located. In the case of FIGS. 8 and 9 there will also be contact where the compressor 124 is located, with respect to the enriched streams from the previous module. The partitions 132 thus serve to reduce mixing of adjacent streams and sub-streams, while the advantages of having a single compressor 20, a single compressor 124 where provided, a single heat exchanger 22 and a single separator 24 for each module 10 are retained.

Use of the method and module in accordance with the invention, for cuts in the region of 1/20 in the enrichment of uranium hexafluoride ($UF_6$) with respect to $U^{235}$, is expected to lead to a reduction in plant cost of in the region of at least 20% and possibly up to 50% or more. Loss of efficiency owing to mixing by diffusion where gas streams and sub-streams are in contact is believed to be under 10% when compared with conventional cascade arrangements, and the cost of extra modules to make up this loss will be substantially more than compensated for by the savings occasioned by the use of standardized and relatively large modules.

We claim:

1. In a separation process wherein a gas is passed through a cascade made up of a plurality of stages each comprising a separator, the method which includes the steps of:

withdrawing the gases issuing from the separators of a plurality of stages in the cascade to a single compressor, the gases from at least some of the separators having different compositions;

combining said gases to form a single stream the composition of which varies in a known fashion over a cross-section of the stream transverse to the direction of movement of the stream from a minimum with respect to the concentration of one of the gases being separated to a maximum with respect to said concentraton;

passing the stream through said single compressor without destroying the variation in composition;

separating the stream into a plurality of parts, at least some of which have different compositions; and passing said parts through further stages in the cascade.

2. A method as claimed in claim 1, in which the separation process is an isotope separation process, the separators being isotope separators, the differences and variation in composition being differences and variation in isotopic composition, and the minimum and maximum being of the concentration of one of the isotopes being separated.

3. A method as claimed in claim 1, in which combining the gases to form the single stream is such that the variation in composition takes place in a circumferential direction such that a gradient with respect to the said concentration exists along a line located in the stream and extending parallel to the periphery of the stream in the plane of said cross-section, the minimum and maximum being circumferentially spaced from each other.

4. A method as claimed in claim 3, in which combining said gases to form the single stream is such that the stream is annular in cross-section and such that the minimum and maximum are located at diametrically opposed positions.

5. A method as claimed in claim 1, in which said compressor comprises an axial flow impeller or propellor having a plurality of radially extending circumferentially spaced blades or vanes, the stream moving across the blades or vanes in the direction of the axis of the compressor.

6. A method as claimed in claim 5, in which passing the stream through the compressor is such that no substantial movement of the stream in a radial direction relative to the compressor is established by the compressor.

7. A method as claimed in claim 1, which includes the step of changing the temperature of the gas in the stream after combining the gases to form the stream and before separating the stream into a plurality of parts.

8. A method as claimed in claim 7, in which changing the temperature of the gas in the stream comprises moving the stream through a foraminous heat exchange element.

9. A method as claimed in claim 1, comprising moving the stream along a passage which forms at least part of an endless circuit, at least part of the stream circulating around the circuit more than once.

10. A method as claimed in claim 9, comprising moving the gas of the stream so that it follows at least one helix-like path as it moves along the circuit, the axis of each helix-like path being transverse to the direction of movement of the stream along the passage and each complete loop of each helix-like path extending the full length of the circuit.

11. A method as claimed in claim 10, in which there are two helix-like paths, extending circumferentially in opposite circumferential directions, relative to the periphery of the passage presented by a cross-section through the passage transverse to the direction of flow along the passage, from the minimum to the maximum, and each path passing more than once around the circuit.

12. A method as claimed in claim 10, which includes diverting the flow of at least part of the stream in the passage, to encourage flow of the fluid along each said helix-like path.

13. A method as claimed in claim 1, which includes the step of using paartitions extending in the direction of movement along part of the passage to separate parts of the stream from one another, thereby to combat disappearance of the variation in composition of the stream.

14. For a separation process wherein a gas is passed through a cascade made up of a plurality of stages each comprising a separator, the apparatus which comprises:

a compressor;

a plurality of separators arranged so that they are in different stages in the cascade;

conduit means for withdrawing gases of different compositions from various separators to the compressor and for combining said gases to form a single stream the composition of which varies in a known fashion over a cross-section of the stream transverse to the direction of movement of the stream from a minimum with respect to the concentration of one of the gases being separated to a maximum with respect to said concentration, and for feeding said stream to the compressor; and means for separating the stream issuing from the compressor into a plurality of parts at least some of which have different compositions, and for passing said parts through further stages in the cascade.

15. Apparatus as claimed in claim 14, in which the separation process is an isotope separation process, the separators being isotope separators, the differences and variation in composition being differences and variation in isotopic composition, and the minimum and maximum being of the concentration of one of the isotopes being separated.

16. Apparatus as claimed in claim 14, which comprises means defining a passage which forms at least part of an endless circuit, the compressor being located in the passage and at least some of the separators forming part of the circuit, there being at least one inlet into the circuit and at least one outlet from the circuit, the inlet, outlet and compressor being so located that operation of the compressor to cause movement of the stream along the circuit causes circulation of at least part of the stream more than once around the circuit along at least one helix-like path around the circuit and along the passage, the axis of the helix-like path being transverse to the direction of movement of the stream along the passage and each complete loop of the helix-like path extending the full length of the circuit.

17. Apparatus as claimed in claim 16, in which the compressor comprises an axial flow impeller or propellor of a type having a plurality of radially extending circumferentially spaced blades or vanes and which moves the gas stream across the blades or vanes in the longitudinal direction of the passage.

18. Apparatus as claimed in claim 16, in which the passage is annular, there being a main inlet into one section of the passage and a main outlet from a circumferentially spaced sector of the passage, so that the gas entering the main inlet divides into two parts which follow different helix-like paths, the paths extending in opposite circumferential directions, relative to the periphery of the passage presented by a cross-section through the passage transverse to the direction of flow along the passage, around the circuit from the main inlet to the main outlet.

19. Apparatus as claimed in claim 18, which has a plurality of subsidiary inlets into the circuit which are spaced relative to one another and a plurality of subsidiary outlets from the circuit which are spaced relative to one another.

20. Apparatus as claimed in claim 16, which includes deflecting means for diverting gas flowing along the circuit, to encourage said part to follow said helix-like path.

21. In an isotope separation process wherein a gas is passed through a cascade made up of a plurality of stages each comprising an isotope separator, the method which includes the steps of:
feeding into a length of passage which is annular in cross-section a stream of gas having a composition which varies in a known fashion with respect to the isotopic composition thereof over a cross-section of the stream transverse to the direction of movement of the stream, the composition varying in a circumferential direction from a minimum with respect to the concentration of one of the isotopes being separated to a maximum with respect to said concentration, the minimum and maximum being located at circumferentially spaced positions and the passage forming at least a part of an endless circuit;
moving the stream along the length of passage so that at least part of the stream circulates around the circuit more than once without disappearance of the variation in composition, the gas of the stream following a pair of different helix-like paths as it flows around the circuit, the helix-like paths having axes which are transverse to the direction of movement of the stream along the passage and each complete loop of each helix-like path extending the full length of the circuit;
diverting the flow of at least part of the stream of the passage to encourage flow of gas along said helix-like path; and
separating at least some parts of the stream having different isotopic compositions from one another while withdrawing them from the passage.

22. A method as claimed in claim 21, in which the endless circuit is defined by an inner cylindrical housing located within and extending along the interior of an outer cylindrical housing, opposite ends of the inner housing opening into opposite ends of the outer housing, and in which the helix-like paths have axes which extend in opposite circumferential directions relative to the housings from the minimum to the maximum.

23. Apparatus for the treatment of a gas in an isotope separation process wherein a gas is passed through a cascade made up of a plurality of stages each comprising an isotope separator, which apparatus comprises:
an inner housing extending along the interior of an outer housing to define an annular passage which forms at least a part of a circuit;
at least one inlet into the circuit and at least one outlet from the circuit, there being a main inlet into one sector of the passage and a main outlet from a circumferentially spaced sector of the pasage; and
means for causing flow of a gas stream along the circuit so that gas entering the main inlet divides into two parts which circulate more than once around the circuit and which follow different helix-like paths around the circuit and through the passage to the main outlet, each complete loop of each helix-like path extending the full length of the circuit.

24. Apparatus as claimed in claim 23, in which the inner housing is annular and opposite ends of the inner housing open into opposite ends of the outer housing to define the annular passage.

* * * * *